(12) United States Patent
Nagpal et al.

(10) Patent No.: US 8,495,108 B2
(45) Date of Patent: Jul. 23, 2013

(54) VIRTUAL NODE SUBPOOL MANAGEMENT

(75) Inventors: Abhinay R. Nagpal, Maharashtra (IN);
Sandeep Ramesh, Elmsford, NY (US);
Sri Ramanathan, Lutz, FL (US);
Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 12/956,076

(22) Filed: Nov. 30, 2010

(65) Prior Publication Data

US 2012/0136907 A1 May 31, 2012

(51) Int. Cl.
*G06F 17/30* (2006.01)

(52) U.S. Cl.
USPC ........................................... 707/822

(58) Field of Classification Search
None
See application file for complete search history.

(56) References Cited

U.S. PATENT DOCUMENTS

| | | | |
|---|---|---|---|
| 6,078,929 A | 6/2000 | Rao | |
| 6,950,833 B2 | 9/2005 | Costello et al. | |
| 7,640,247 B2 | 12/2009 | Pudipeddi | |
| 7,640,274 B2 | 12/2009 | Tinker et al. | |
| 7,743,035 B2 | 6/2010 | Chen et al. | |
| 2003/0028514 A1 | 2/2003 | Lord et al. | |
| 2003/0028531 A1* | 2/2003 | Han et al. | 707/6 |
| 2005/0050107 A1* | 3/2005 | Mane et al. | 707/200 |
| 2005/0262160 A1* | 11/2005 | Grebenev | 707/201 |
| 2008/0228923 A1* | 9/2008 | Chidambaran et al. | 709/227 |
| 2008/0235293 A1 | 9/2008 | Levering et al. | |
| 2008/0288506 A1 | 11/2008 | Brown | |
| 2009/0228685 A1* | 9/2009 | Wei et al. | 712/31 |
| 2009/0271506 A1* | 10/2009 | Arai et al. | 709/223 |
| 2010/0011028 A1* | 1/2010 | Dade | 707/200 |
| 2011/0153270 A1* | 6/2011 | Hoffman | 702/179 |

FOREIGN PATENT DOCUMENTS

| | | | |
|---|---|---|---|
| EP | 0279232 A3 | 8/1988 | |
| EP | 1892921 A3 | 4/2008 | |

OTHER PUBLICATIONS

Tanel Poder, "ORA-04031 errors and monitoring shared pool subpool memory utilization with sgastatx.sql,", Tanel Poder's Blog: IT & Mobile for Geeks and Pros, Jun. 4, 2009, http://blog.tanelpoder.com/2009/06/04/ora-04031-errors-and-monitoring-shared-pool-subpool-memory-utilization-with-sgastatxsql/, (accessed May 31, 2012).*

(Continued)

*Primary Examiner* — Fred I Ehichioya
*Assistant Examiner* — Richard Bowen
(74) *Attorney, Agent, or Firm* — Patrick J. Daugherty; Driggs, Hogg, Daugherty & Del Zoppo Co., LPA (57) ABSTRACT

Virtual file system virtual nodes are grouped in subpools in response to identified resource components and managed as a function of their subpool groupings. Virtual nodes are decomposed into individual components linked to each other within each node. The components that have repetitive accesses by applications within the virtual file system and their respective frequencies of repetitive access are identified. Modules of linked occurrences of the repetitive components within each of the plurality of virtual nodes are formed, and subsets of the virtual nodes sharing common modules are grouped into subpools. Accordingly, in response to an application of the virtual file system requesting a service that is satisfied by a subpool common module, selection of a virtual node for reinitiating for reuse by the application is restricted to virtual nodes within the subpool associated with the common module.

12 Claims, 3 Drawing Sheets

OTHER PUBLICATIONS

Szeto et al., "A Multi-Commodity Flow Based Approach to Virtual Network Resource Allocation," 2003 IEEE, GLOBECOM 2003, pp. 3004-3008.*

Shamsi, J.; Brockmeyer, M.; , "QoSMap: QoS aware Mapping of Virtual Networks for Resiliency and Efficiency," Globecom Workshops, 2007 IEEE , vol., no., pp. 1-6, Nov. 26-30, 2007.*

Xiao et al. "Dynamic Cluster Resource Allocations for Jobs with Known and Unknown Memory Demands," IEEE 2002, IEEE Transactions on Parallel and Distributed Systems archive, vol. 13 Issue 3, Mar. 2002 p. 223-240.*

Grant M. Erickson, The Design and Implementation of the Global File System in Silicon Graphics' Irix, Project Submitted to the Faculty of the Graduate School of the University of Minnesota, Mar. 1998, 53 pages.

S. R. Kleiman, Vnodes: An Architecture for Multiple File System Types in Sun UNIX, Sun Microsystems, Proceedings of the Summer 1986 USENIX Conference, Atlanta, pp. 1-10.

* cited by examiner

VIRTUAL NODE SUBPOOL MANAGEMENT

BACKGROUND

The present invention relates to managing resources within architecture for accommodating multiple file system implementations, and more particularly with respect to efficient file system implementations in Unix and Unix-like operating systems.

Unix operating systems are widely used in servers, workstations, and mobile devices. (UNIX is a trademark of The Open Group in the United States or other countries.) Unix is generally designed to be portable, multi-tasking and multi-user in a time-sharing configuration. Unix and Unix-like operating systems may be characterized by various concepts, including the use of plain text for storing data; hierarchical file systems; the ability to treat devices and certain types of inter-process communication (IPC) as files; and the incorporation of software tools, small programs that may be strung together through a command line interpreter using pipes, in contrast to alternative approaches that use single monolithic programs to achieve functionality.

A Unix operating system comprises utilities and a master control program known as the kernel. The kernel provides services to start and stop programs, handles the file system and other common low level tasks that most programs share, and schedules access to hardware to avoid conflicts if two programs try to access the same resource or device simultaneously. To mediate such access, the kernel is generally given special rights, and in one aspect the Unix operating environment may be described as divided between user-space and kernel-space.

BRIEF SUMMARY

In one embodiment, a method is provided for grouping virtual file system virtual nodes in subpools in response to identified resource components and for managing the virtual nodes as a function of their subpool groupings. The method includes decomposing each of a plurality of virtual nodes within a virtual file system into individual components linked to each other within each node. A processor identifies the decomposed individual components that have repetitive accesses by applications within the virtual file system and their respective frequencies of the repetitive accesses. Modules of linked occurrences of the repetitive components within each of the plurality of virtual nodes are formed, and subsets of the virtual nodes sharing common modules are grouped into subpools. Accordingly, in response to an application of the virtual file system requesting a service that is satisfied by a subpool common module, selection of a virtual node for reinitiating for reuse by the application is restricted to virtual nodes within the subpool associated with the common module.

In another embodiment, a computer system includes a processing unit, computer readable memory and a computer readable storage system. Program instructions on the computer readable storage system cause the processing unit to decompose each of a plurality of virtual nodes within a virtual file system into individual components linked to each other within each node and identify the decomposed individual components that have repetitive accesses by applications within the virtual file system and their respective frequencies of the repetitive accesses. Modules of linked occurrences of the repetitive components within each of the plurality of virtual nodes are formed, and subsets of the virtual nodes sharing common modules are grouped into subpools. Accordingly, in response to an application of the virtual file system requesting a service that is satisfied by a subpool common module, selection of a virtual node for reinitiating for reuse by the application is restricted to virtual nodes within the subpool associated with the common module.

In another embodiment, a computer program product includes program instructions to decompose each of a plurality of virtual nodes within a virtual file system into individual components linked to each other within each node and identify the decomposed individual components that have repetitive accesses by applications within the virtual file system and their respective frequencies of the repetitive accesses. Modules of linked occurrences of the repetitive components within each of the plurality of virtual nodes are formed, and subsets of the virtual nodes sharing common modules are grouped into subpools. Accordingly, in response to an application of the virtual file system requesting a service that is satisfied by a subpool common module, selection of a virtual node for reinitiating for reuse by the application is restricted to virtual nodes within the subpool associated with the common module.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. Examples of a computer readable storage medium exclude transitory, propagation or carrier wave signals or subject matter and include an electronic, magnetic, optical, or semiconductor system, apparatus, or device, or any suitable combination of the foregoing. More specific examples of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is not a transitory, propagation or carrier wave signal, but is instead any tangible medium that can contain, or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
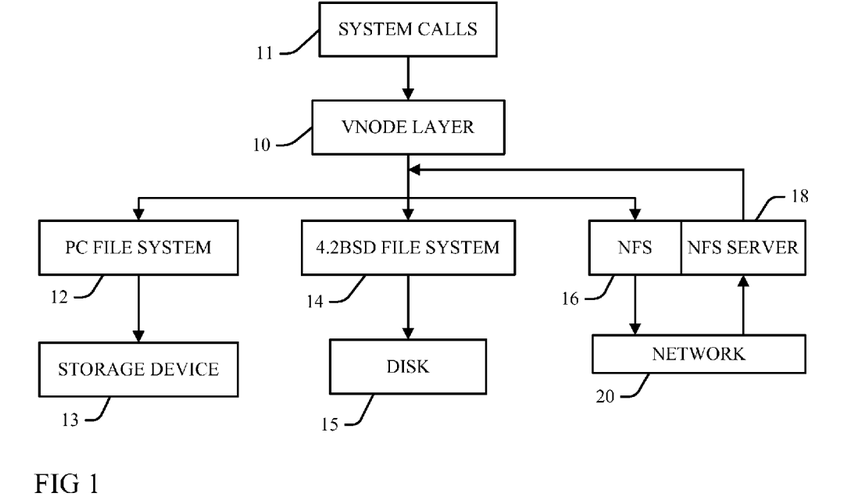
FIG. 1 provides a block diagram of a Virtual File System (VFS) appropriate for practicing with embodiments of the present invention.

FIG. 1 provides a block diagram of a Unix architecture file system featuring a Virtual File System (VFS) appropriate for practicing with embodiments of the present invention. A file system dependent/independent split is provided just above a kernel inode layer, the main object for file manipulation in the kernel. An inode is a data structure on a traditional Unix-style file system that stores basic information about a regular file, directory, or other file system object. A file system independent inode is renamed as a vnode (virtual node), wherein all file manipulation is done with a vnode object and the file system independent layer receiving system calls 11 is generally referred to as the vnode layer 10. Vnodes can represent directories, files, first-in-first-out queues (FIFO's), sockets, etc. The file system implementation dependent layers are called by their respective implemented file system types, in the present example a personal computer file system 12 in communication with a storage device 13, a 4.2BSD (Berkeley Software Distribution) file system 14 in communication with a disk memory 15, and a network file system (NFS) 16 utilized by a network server 18 in communication with a network 20.

By splitting the file system implementation independent and the file system implementation dependent functionality of the kernel and providing a well defined interface between the two parts, the VFS Unix system accommodates multiple file system implementations encompassing local, remote, or even non-UNIX file systems, wherein such file systems may be plugged into the kernel through the defined interface in a fashion similar to adding device drivers to the kernel. Each mounted VFS is linked into a list of mounted file systems, and the first file system on the list is always the root. Private data pointers (for example, vfs_data) in the VFS point to file system dependent data. In the present example, private data pointers for the 4.2BSD file system point to a mount table entry, and the public data in the VFS structure contains data used by the vnode layer 10 or data about the mounted file system that does not change.

The public data fields in each vnode either contain data that is manipulated only by the VFS layer or data about the file that does not change over the life of the file, such as the file type. Each vnode contains a reference count which is maintained by generic vnode macros. The vnode layer and file systems call these macros when vnode pointers are copied or destroyed. When the last reference to a vnode is destroyed, an inactive operation may be called to tell the vnode's file system that there are no more references, and the file system may then destroy the vnode or cache it for later use. A field in the vnode points to the VFS for the file system to which the vnode belongs. If a vnode is a mount point, then it points to the VFS for another file system. The private data pointer in the vnode points to data that is dependent on the file system. In the 4.2BSD file system 14, a field points to an in core inode table entry.

Figure 2:
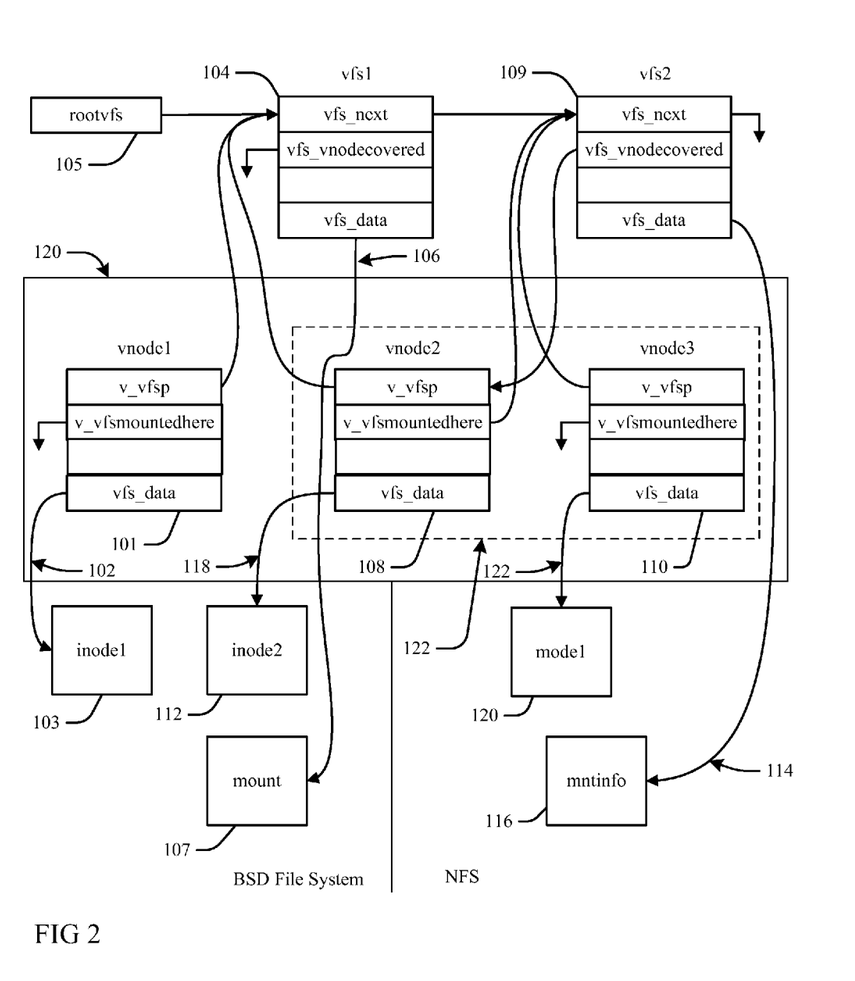
FIG. 2 is an illustration of an example vnode and VFS object interconnection according to the present invention.

FIG. 2 is an illustration of an example vnode and VFS object interconnection according to the present invention with respect to the VFS of FIG. 1. Vnode1 101 is a file or directory in the 4.2BSD type file system 14 of FIG. 1, and as such, its private data pointer 102 points to an inode1 103 in the 4.2BSD file system's inode table. Vnode2 108 has a private data pointer 118 pointing to an inode2 112 in the 4.2BSD file system's inode table. Vnode1 104 belongs to vfs1 104, which is the root vfs since it is the first on the vfs list (rootvfs 105). Vfs1's private data pointer 106 points to a mount table entry 107 in the 4.2BSD file system's mount table. Vnode2 108 is a directory in vfs1 104, which is the mount point for vfs2 109. Vfs2 109 is the NFS file system 16 of FIG. 1. A vfs2 109 data pointer 114 points to a mount information entry 116 in the NFS system, and a data pointer 122 of the vnode3 110 points to a model 120 in the NFS system.

Figure 3:
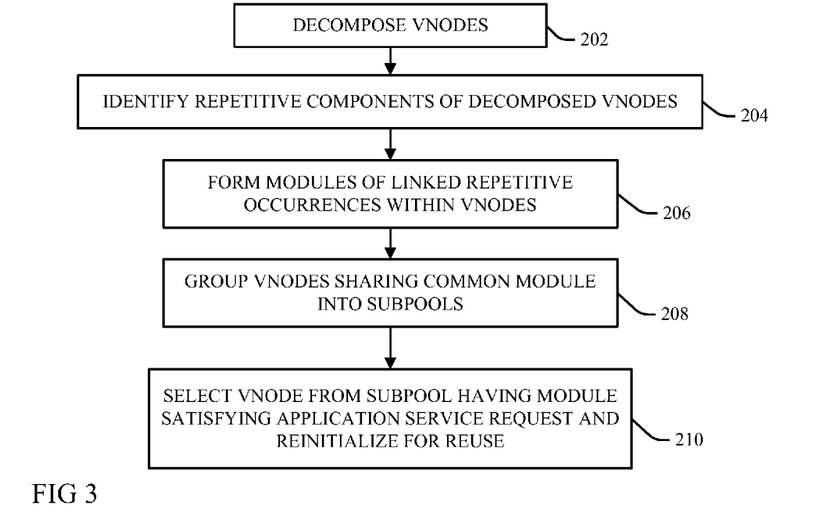
FIG. 3 illustrates a method or process according to the present invention for grouping the vnodes in subpools in response to identified resource components.

FIG. 3 illustrates a method or process according to the present invention for identifying the resource components of vnodes interacting with each of the applications from a set of applications, and grouping the vnodes in subpools in response to their identified resource components, and further for managing the vnodes as a function of their subpool groupings. More particularly, at 202 the process decomposes the vnodes in a virtual file system into the individual resource components linked to each other within the respective vnodes. At 204 modules or groupings of linked occurrences of the individual components that have repetitive accesses by applications within the virtual file system components are identified, along with their respective frequencies of repetitive access.

At 206 modules of linked occurrences of the repetitive components are formed within each of the virtual nodes, and at 208 the vnodes are grouped into one more vnode subpools as a function of sharing common modules of the repetitive access components (for example, grouping the vnode2 108 and vnode3 110 into the vnode subpool 122 in FIG. 2). At 210, in response to an application of the virtual file system requesting a service that is satisfied by the subpool common module, a vnode is selected from the subpool and reinitiated for reuse by the application, wherein the selecting is restricted to vnodes within the subpool. More particularly, selection of vnodes for reuse by an application at 210 comprises selecting from only the subpool (or subpools) of vnodes that each have common modules of components that satisfies or matches the service requested by the application, which is less than an entire, universal pool of all of the VFS vnodes.

In contrast, in the prior art, vnodes (for example, the vnodes 101, 108 and 110) are managed in a single pool of vnodes 120, generally grouped at random into the single pool 120 wherein when the vnodes and their resources are allocated to a plurality of applications and they are initialized. After serving their respective applications, in such prior art systems they are kept initialized for some time (in case the same application needs them), else they are allocated to some other application at random wherein they need to be reinitialized with information like inodes, cache heap, etc., and also to reference the appropriate system open file table, process current directory, file system mount points, etc. Such re-initializations may demand a large overhead in system resources and can have adverse impact on throughput. Moreover, all file systems and applications also have to compete for resources from this single pool of vnodes, and heavy vnode activity by one application or a particular file system can adversely impact the performance in another application or file system in such an approach.

Instead of managing the vnodes for all of the file systems in a single pool of vnodes, multiple independent subpools are established according to the present invention by intelligently finding similar vnodes serving applications and reusing only pooled vnodes by grouping similar vnodes for requesting applications together such that vnodes corresponding to files frequently accessed by similar applications are pooled together for use and access by said applications. When an application disconnects or a dynamically mountable file system is un-mounted, there is generally a certain level of vnode cleanup processing that must occur. For example, the file system must be quiesced and all of the vnodes currently in use for that file system must be located and returned to the vnode pool. Quiescence generally refers to preventing a computer system from starting new jobs so that the system gradually winds down as current jobs are completed, for example in preparation for a planned outage. Finding all the vnodes that belong to a particular file system can be complicated and time consuming in single pool 120 methodologies. Exemplary overheads introduced by single VFS pooling with respect to some exemplary file systems include about 4.0% on an xfs file system, 3.0% on an ext3 file system, and 12.4% in certain other file systems such as a ReiserFS file system (developed by Hans Reiser et al.), a Journaled/Journaling File System (JFS) or the NFS 16 of FIG. 1.

In contrast, embodiments of the present invention reduce overhead by obviating the need for quiescing vnodes outside of a subpool associated with a given file system. The total amount of vnodes that must be located, quiesced and returned to said vnode subpool pool is thereby reduced relative to prior art common pools which contain many more vnodes. Vnodes outside of a desired subpool are those that do not (or are not as likely to) satisfy the needs of the requesting application, resulting in corresponding increases in system efficiencies. Identifying vnodes interacting with each of the applications and grouping the vnodes in response to their identified resources into subpool sets of applications, wherein a vnode may be assigned from a subpool to a subsequent application based on a correspondence to an identified resource (for example, a file system object, metadata, etc.), thus results in improved efficiencies, in one aspect only vnodes corresponding to each of the identified resources must be initialized.

In another aspect, single applications may thereby be prevented from exclusively utilizing too many of the vnode resources from the larger over-all common vnode pool 120, wherein such an application may instead be restricted to use of only those vnodes within an identified corresponding subpool 122, leaving vnodes outside of the specified subpool 122 available for other applications. Less synchronization contention also occurs in a subpool organization compared to unitary single pools.

For example, consider three vnode applications in First-Come-First-Served (FCFS) VFS Unix-type structure: Application A1 is an application comprising a heap structure of components for accessing payroll tables and employee information files; Application A2 is an application comprising a heap structure of components for accessing electricity usage files; and Application A3 is an application comprising a heap structure of components for also using payroll tables and employee information files in common with those used by Application A1. Heap information refers to a tree-based data structure that satisfies a heap property: if B is a child node of A, then key(A)≧key(B), which implies that an element with the greatest key is always in the root node, sometimes referred to as a max-heap. Alternatively, the comparison may be reversed (key(A)≦key(B)), wherein a smallest element will always be in the root node, is sometimes referred to as a min-heap. Variants of heaps are used in efficient implementations of the abstract data type priority queues, which are useful in many applications, for example in efficient graph algorithms. It will also be appreciated that other data tree organizations are appropriate for practicing with the present invention, which is not limited to the examples provided herein.

Reinitializing vnodes comprising heap information requires overhead resources, and the requirements may be considerable in the prior art as each of many vnodes in a common single pool 120 must be reinitialized, particularly where several connections are being made. In contrast, in the present invention, only those vnodes within a target subpool need be reinitialized. Thus, in the present example, A1 and A3 are grouped together and A2 falls in a different group, requiring only the reinitialization of A1 and A3 for a matching requesting application, and not for A2. Moreover, overhead may be further eliminated if apps A1 and A3 require the same information, and thus subpooling with respect to heap information similarity provides further overhead saving for each service connection. As production environments may comprise large numbers of connections, large time efficiencies may be realized in saving time by avoiding unnecessary, duplicative reinitializations by limiting vnodes to those within the smaller subpools compared to the prior art without subpools.

In one embodiment of the process and method, subpooling is achieved by reviewing identified vnode data tree information by scanning vnode logs that capture vnode file component accesses by applications and determining subpool commonalities as a function of service modules meeting an occurrence frequency threshold (T). Thus, one example applies the following code implementation of Table 1 to scan vnode logs:

TABLE 1

```
struct inode_operations {
    struct file_operations * default_file_ops;
    int (*create) (struct inode *,const char *,int,int,struct inode **);
    int (*lookup) (struct inode *,const char *,int,struct inode **);
    int (*link) (struct inode *,struct inode *,const char *,int);
    int (*unlink) (struct inode *,const char *,int);
    int (*symlink) (struct inode *,const char *,int,const char *);
    int (*mkdir) (struct inode *,const char *,int,int);
    int (*rmdir) (struct inode *,const char *,int);
    int (*mknod) (struct inode *,const char *,int,int,int);
    int (*rename) (struct inode *,const char *,int, struct inode *,
        const char *,int, int); /* this from 2.0.1 onwards */
    int (*readlink) (struct inode *,char *,int);
    int (*follow_link) (struct inode *,struct inode *,int,int,struct
    inode**);
    int (*readpage) (struct inode *, struct page *);
    int (*writepage) (struct inode *, struct page *);
// These operations are logged to capture file accesses by applications
    int (*bmap) (struct inode *,int);
    void (*truncate) (struct inode *);
    int (*permission) (struct inode *, int);
    int (*smap) (struct inode *,int);
};
```

Table 2 below illustrates the results of the vnode log scanning for a threshold value T=3:

TABLE 2

| Input itemset | Frequent items and their frequencies are:<br>f 4<br>f 4<br>a 3<br>c 4<br>c 4 =><br>a 3<br>b 3<br>b 3<br>m 3<br>m 3<br>p 3<br>p 3 | Frequent input sequence: | Sorted frequent input sequence: |
|---|---|---|---|
| f a c d g i m p | | f a c m p | f c a m p |
| a b c f l m o | | a b c f m | f c a b m |
| b f h j o | | b f | f b |
| b c k s p | | b c p | c b p |
| a f c e l p m n | | a f c p m | f c a m p |

The first column of Table 2 identifies individual resource components (files) within each of a plurality of vnode rows. The second column of Table 2 identifies those components having repetitive accesses by applications with a frequency meeting the threshold (greater than or equal to three) and their respective frequencies, the components ranked by higher to lowest frequencies. The third column of Table 2 illustrates the vnodes decomposed into a frequent input sequence wherein components not meeting the threshold have been dropped, each decomposed vnode listing only the frequently occurring items from the second column (i.e. those items discovered in the initial log scan). The log is then iteratively scanned again, and for each sample items from the sample are added to an existing tree, the process then repeated until all samples have been processed. The frequent input sequences are then sorted and reordered by frequency in the fourth column of Table 2, the highest frequency components serving as the root for progressively lower ranked components.

Figure 4:
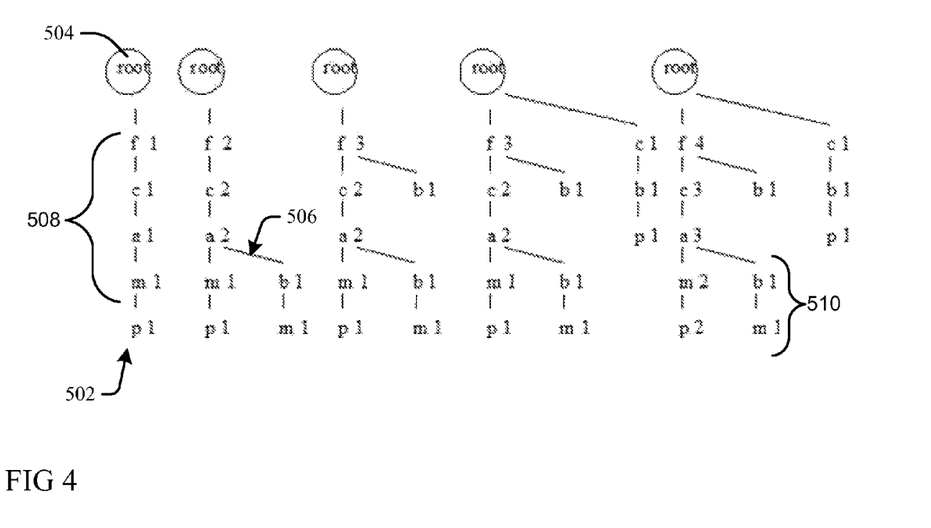
FIG. 4 is an illustration of reordered vnode trees according to the present invention.

More particularly, FIG. 4 illustrates trees 502 constructed using the last, fourth column of Table 2. Subpool frequent itemsets are defined by the tree paths 502, starting from the roots 504. At each branching 506, the process determines if any item from the branches can be added to a frequent path, i.e. if the total of branches 506 gives the frequency T for this item. Thus, the derived trees 502 identify ordered frequent filesets "f c a m" 508 and branches "b m" 506 as meeting this frequency, and these ordered frequent filesets are used to form subpools comprising nodes providing the decomposed sets.

Accordingly, when a client of the VFS requests a new vnode, the vnode allocation code can reuse an old vnode object that is no longer in use by selecting one or more vnodes from a corresponding subpool. Whether a vnode is in use is generally tracked by a vnode reference count (for example, v_usecount). Conventionally, each open file handle holds a reference, as do virtual machine (VM) objects backed by files. A vnode with a reference count of one or more will not be de-allocated or reused to point to a different file. A vnode that points to a valid file and has a reference count of one or more is called active. When a vnode's reference count drops to zero, it becomes inactive, that is, a candidate for reuse. According to the present invention, initialization overhead is also saved, reduced, by reallocating a vnode (from an appropriate subpool) to an application which requires the same information, as indicated by the relation of the application to the subpool.

In some embodiments, cuckoo hashing is used to fetch files from a subpool by using two hash functions instead of one. This provides two locations in the hash table for each key. When a key is inserted, a greedy approach is used. The new key is inserted in one of the two possible locations, displacing (kicking out) any key that might already reside in this location. The displaced key is then inserted to its alternative location, again kicking out any key that might reside there. The insertions of the input key and all the kicked-out keys go on until a vacant position is found. Table 3 below provides an example of a cuckoo hashing pseudo-code according to the present invention:

TABLE 3

```
Initialize hash functions hash1( ) and hash2( )
BEGIN:
Open Vnodesubpool
While there is an element init_x to insert
    Set x = init_x
    While init_x is not kicked off and x is not inserted
        If hash1(x) is free
            Insert x in hash1(x)
        Else if hash2(x) is free
            Insert x in hash2(x)
        Else
            Kick off element y in hash1(x)
            Insert x in hash1(x)
            Set x = y
        End if
    End while
    If init_x is kicked off
        Update hash functions hash1( ) and hash2( )
        Go to BEGIN
    End if
End while
Close Vnodesubpool
```

An inactive vnode may still refer to a valid file and one may try to reactivate it, for example using vget. Before the VFS can reuse an inactive vnode to refer to another file, it must clean all information pertaining to the old file, and a cleaned out vnode is generally called a reclaimed vnode.

To support forcible un-mounts and a revoke system call, a VFS according to the present invention may reclaim a vnode with a positive reference count. For example, the reclaimed vnode may be given to a dead file system, which returns errors for most operations. The reclaimed vnode will not be reused for another file until its reference count hits zero.

Embodiments of the present invention thus provide efficiencies and save resources and have application in a variety of clouded file systems, Green IT and cloud computing energy management for data center contexts, in one aspect lowering costs spent on power utilized for data access from data centers and from data clouds.

Figure 5:
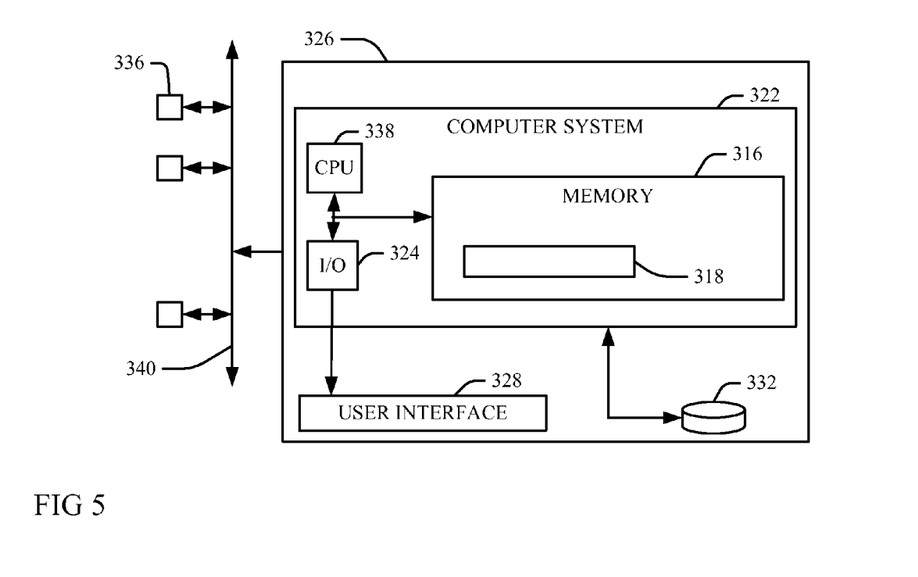
FIG. 5 is a computerized implementation of an embodiment of the present invention.

Referring now to FIG. 5, an exemplary computerized implementation of an embodiment of the present invention includes client computer or other programmable device 322 in communication with a user interface 328 and with one or more third party servers 336 accessible through an SSL or other secure web interface 340, for example in response to computer readable code 318 in a file residing in a memory 316 or a storage system 332 through a computer network infrastructure 326. The implementation is intended to demonstrate, among other things, that the present invention could be implemented within a network environment (e.g., the Internet, a wide area network (WAN), a local area network (LAN) or a virtual private network (VPN), etc.) Communication can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with the memory 316 and with one or more external I/O devices/resources 324, user interfaces 328 and storage systems 332. In general, the processing unit 338 may execute computer program code, such as the code to implement one or more of the process steps illustrated in the Figures, which may stored in the memory 316 and/or external storage system 332 or user interface device 328.

The network infrastructure 326 is only illustrative of various types of computer infrastructures for implementing the invention. For example, in one embodiment, computer infrastructure 326 comprises two or more computing devices (e.g., a server cluster) that communicate over a network. Moreover, the computer 322 is only representative of various possible computer systems that can include numerous combinations of hardware. To this extent, in other embodiments, the computer 322 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 338 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 324 can comprise any system for exchanging information with one or more of the external device 328. Still further, it is understood that one or more additional components (e.g., system software, math co-processing unit, etc.) not shown can be included in the computer 322.

One embodiment performs process steps of the invention on a subscription, advertising, and/or fee basis. That is, a service provider could offer to group virtual file system virtual nodes in subpools in response to identified resource components and manage the virtual nodes as a function of their subpool groupings. In this case, the service provider can create, maintain, and support, etc., a computer infrastructure, such as the network computer infrastructure 326 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles to group virtual file system virtual nodes in subpools in response to identified resource components and manage the virtual nodes as a function of their subpool groupings, as described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for grouping virtual file system virtual nodes in subpools in response to identified resource components and for managing the virtual nodes as a function of their subpool groupings, the method comprising:

decomposing each of a plurality of virtual nodes within a virtual file system into individual components that are linked to each other within the virtual nodes;

identifying via a processor components of the decomposed individual components that have repetitive accesses by applications within the virtual file system as repetitive access components;

forming ordered tree modules of linked occurrences of the accesses of the repetitive access components by ordering linked repetitive access components that have highest frequencies of the accesses by the applications and comprise at least three accesses as root components and progressively depending others of the linked repetitive access components that have at least three accesses from the roots as a function of their relatively lower frequencies of the accesses by the applications, and omitting the linked repetitive access components that each have less than three accesses by the applications;

grouping a subset of the virtual nodes each sharing a common module into a subpool;

in response to an application of the virtual file system requesting a service that is satisfied by the subpool, selecting a virtual node from the subpool and reinitiating the selected virtual node for reuse by the application, wherein the selecting the virtual node from the subpool comprises restricting selection of virtual nodes within the subpool; and locating, quiescing and returning only inactive virtual nodes that are within the selected subpool in response to the application requesting the service that is satisfied by the subpool, without quiescing any of the components that are not within the selected subpool.

2. The method of claim 1, wherein the virtual file system is a Unix architecture file system comprising a file system dependent/independent split just above a kernel inode layer, and the virtual nodes are file system independent inodes.

3. The method of claim 2, wherein the individual components linked to each other within the virtual nodes are in a max-heap structure or a min-heap structure;

wherein the identifying the components of the decomposed individual components that have repetitive accesses by applications within the virtual file system and their respective frequencies of the repetitive accesses comprises scanning virtual node logs that capture virtual node file component accesses by applications; and wherein the forming the ordered tree modules of linked occurrences comprises iteratively rescanning the virtual node logs for each sample and adding the repetitive access components having at least three accesses to the tree from the scanned samples until all samples have been processed.

4. The method of claim 3, further comprising:
using a cuckoo hashing to select and fetch files from the selected subpool for use by the application.

5. A computer system comprising:
a central processing unit, computer readable memory and a computer readable storage system;
first program instructions to decompose each of a plurality of virtual nodes within a virtual file system into individual components that are linked to each other within the virtual nodes;
second program instructions to identify components of the decomposed individual components that have repetitive accesses by applications within the virtual file system as repetitive access components, to form ordered tree modules of linked occurrences of the accesses of the repetitive access components by ordering linked repetitive access components that have highest frequencies of the accesses by the applications and comprise at least three accesses as root components and progressively depending others of the linked repetitive access components that have at least three accesses from the roots as a function of their relatively lower frequencies of the accesses by the applications and omitting the linked repetitive access components that each have less than three accesses by the applications, and to group a subset of the virtual nodes each sharing a common module into a subpool; and third program instructions to, in response to an application of the virtual file system requesting a service that is satisfied by the subpool, select a virtual node from the subpool and reinitiate the selected virtual node for reuse by the application by restricting selection to virtual nodes within the subpool, and to reinitiate the selected virtual node for reuse by the application by locating, quiescing and returning only inactive virtual nodes that are within the selected subpool in response to the application requesting the service that is satisfied by the subpool without quiescing any of the components that are not within the selected subpool; and wherein the first, second and third program instructions are stored on the computer readable storage system for execution by the central processing unit via the computer readable memory.

6. The computer system of claim 5, wherein the virtual file system is a Unix architecture file system comprising a file system dependent/independent split just above a kernel inode layer, and the virtual nodes are file system independent inodes.

7. The computer system of claim 6, wherein the third program instructions are to further restrict use of the virtual nodes by the application requesting the service to only those virtual nodes within the subpool.

8. The computer system of claim 7, wherein the individual components linked to each other within the virtual nodes are in a max-heap structure or a min-heap structure, and wherein the second program instructions are further to:
  identify the components of the decomposed individual components that have repetitive accesses by applications within the virtual file system and their respective frequencies of the repetitive accesses by scanning virtual node logs that capture virtual node file component accesses by applications; and
  form the ordered tree modules of linked occurrences by iteratively rescanning the virtual node logs for each sample and adding the repetitive access components having at least three accesses to the tree from the scanned samples until all samples have been processed.

9. A computer program product for grouping virtual file system virtual nodes in subpools in response to identified resource components and for managing the virtual nodes as a function of their subpool groupings, the computer program product comprising:

a computer readable storage medium;

first program instructions to decompose each of a plurality of virtual nodes within a virtual file system into individual components that are linked to each other within the virtual nodes;

second program instructions to identify components of the decomposed individual components that have repetitive accesses by applications within the virtual file system as repetitive access components, to form ordered tree modules of linked occurrences of the accesses of the repetitive access components by ordering linked repetitive access components that have highest frequencies of the accesses by the applications and comprise at least three accesses as root components and progressively depending others of the linked repetitive access components that have at least three accesses from the roots as a function of their relatively lower frequencies of the accesses by the applications and omitting the linked repetitive access components that each have less than three accesses by the applications, and to group a subset of the virtual nodes each sharing a common module into a subpool; and third program instructions to, in response to an application of the virtual file system requesting a service that is satisfied by the subpool, select a virtual node from the subpool and reinitiate the selected virtual node for reuse by the application by restricting selection to virtual nodes within the subpool, and to reinitiate the selected virtual node for reuse by the application by locating, quiescing and returning only inactive virtual nodes that are within the selected subpool in response to the application requesting the service that is satisfied by the subpool without quiescing any of the components that are not within the selected subpool; and wherein the first, second and third program instructions are stored on the computer readable storage medium.

10. The computer program product of claim 9, wherein the virtual file system is a Unix architecture file system comprising a file system dependent/independent split just above a kernel inode layer, and the virtual nodes are file system independent inodes.

11. The computer program product of claim 10, wherein the third program instructions are to further restrict use of the virtual nodes by the application requesting the service to only those virtual nodes within the subpool.

12. The computer program product of claim 11, wherein the individual components linked to each other within the virtual nodes are in a min-heap structure or a max-heap structure, and wherein the second program instructions are further to:
  identify the components of the decomposed individual components that have repetitive accesses by applications within the virtual file system and their respective frequencies of the repetitive accesses by scanning virtual node logs that capture virtual node file component accesses by applications; and
  form the ordered tree modules of linked occurrences by iteratively rescanning the virtual node logs for each sample and adding the repetitive access items having at least three accesses to the tree from the scanned samples until all samples have been processed.

* * * * *